Nov. 10, 1959 G. N. JENNINGS 2,912,532
CONTROL MECHANISM FOR PROVIDING A SELECTED ONE OF
A PLURALITY OF SEQUENCES OF OPERATIONS
Filed April 14, 1958
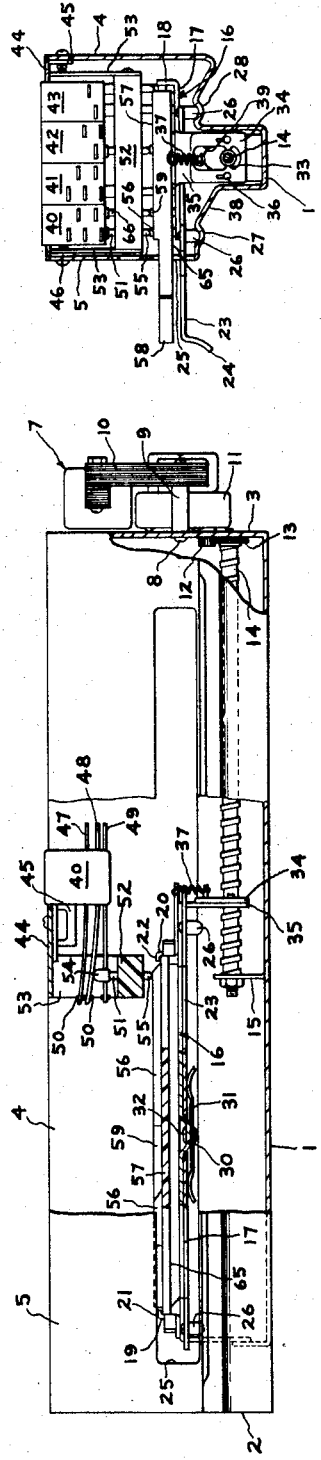
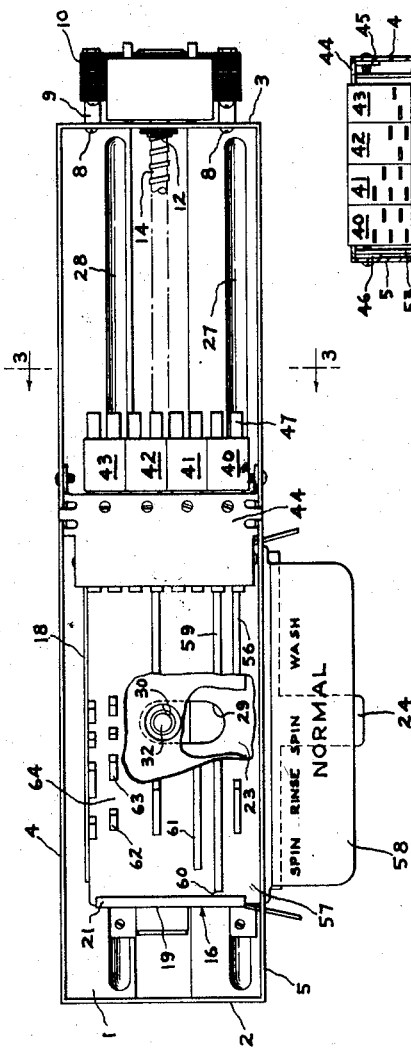
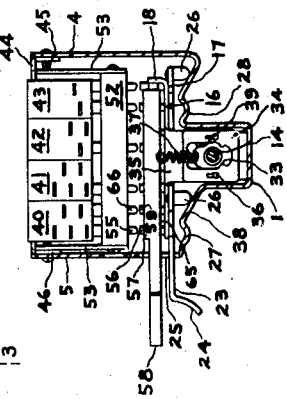
INVENTOR.
GRESHAM N. JENNINGS
BY
HIS ATTORNEY

United States Patent Office 2,912,532
Patented Nov. 10, 1959

2,912,532

CONTROL MECHANISM FOR PROVIDING A SELECTED ONE OF A PLURALITY OF SEQUENCES OF OPERATIONS

Gresham N. Jennings, Louisville, Ky., assignor to General Electric Company, a corporation of New York Application April 14, 1958, Serial No. 728,413

3 Claims. (Cl. 200—38)

This invention relates to controls for a sequence of apparatus operations, and more particularly to an improved control arrangement wherein different sequences of apparatus operations may readily be selected by the operator.

Controls which permit any one of several sequences of operations to be provided may, of course, find utility in many fields. However, such controls are of particular importance in the field of domestic laundry machines, and more particularly washing machines. This results from the fact that many types of fabrics, such as woolens, delicate synthetics, durable synthetics and various cottons all are found in the home, and the most efficient processing of each of these fabrics requires different times of treatment, different water temperatures, different speeds for agitation and spinning, etc., yet all of them must necessarily be processed in the same washing machine. For this reason it is most important for controls for domestic washing machines to provide a plurality of sequences of operations, so that each particular kind of wash can be processed through the sequence of operations most suitable for it.

It is therefore an object of the invention to provide an improved control mechanism including means permitting ready selection of one of a plurality of sequences of operations.

A further object of the invention is to provide such a control mechanism wherein the selection of one of a plurality of sequences of operations may be effected easily in one simple operation.

In carrying out the invention, I provide a control mechanism which permits selection of one of a plurality of sequences of apparatus operations. The control includes movable holder means arranged so that a substantially flat member with a cam surface formed on its face may readily be secured on the holder means by an operator and removed therefrom at the end of the operation of whatever machine is controlled by the mechanism. I provide at least one switch for controlling the apparatus operation, a suitable timer motor, and motion transmitting means connecting the timer motor to the holder means so as to cause the holder means to be moved relative to the switch during operation of the timer motor. The holder means is so positioned with respect to the switch that when it is so moved the cam surface engages appropriate means for actuating the switch in controlling the relation thereto. As the holder means is moved the different rises and flat portions of the cam surface engage the switch actuating means in a predetermined sequence so as to cause the switch to control the apparatus operation in a predetermined manner as determined by the shape of the cam surface. With this construction, it is merely necessary to provide a pluralilty of flat members, each of which has a different cam surface arrangement so that each one provides a different predetermined operation of the switch. The operator need only remove the flat member, or card as it may be called, which was previously used and insert a different card to provide the desired operation for the next cycle. Of course, several cam surfaces may be provided to control any desired number of switches, so that the one simple operation of removing the old card and inserting the new card provides the complete desired sequence.

The novel features which are believed to be characteristic of my invention are set forth with particularity in the appended claims. My invention, itself, however, both as to organization and method of operation, may best be understood by reference to the following description taken in conjunction with the accompanying drawing.

In the drawing, Fig. 1 is a side elevational view of the mechanism, with portions shown in section and with certain surfaces broken away to illustrate details;

Fig. 2 is a plan view of the mechanism with certain surfaces broken away to illustrate details;

Fig. 3 is a sectional view along lines 3—3 in Fig. 2 showing the mechanism in an operative position; and Fig. 4 is a view along the same line as Fig. 3 showing the mechanism in an inoperative position.

Referring now to the drawing, I have shown therein a control mechanism housed within a frame having a bottom portion 1, end walls 2 and 3, a back wall 4, and a front wall 5. The entire mechanism is compact and suitable for mounting adjacent the control panel of a machine whose apparatus operations are to be controlled, such as, for instance, a domestic washing machine. At one end of the housing, a suitable timing motor 7, such as for instance, a low speed synchronous clock motor adapted to run in only one direction, is secured to end wall 3 by any suitable means such as, for instance, by bolts 8 which extend through spacers 9 and the magnetic core 10 of the motor to join them to the end wall 3. Motor 7 drives a gear train, indicated generally at 11, which through pinion 12 drives a gear 13 which is secured to and concentric with a drive worm 14 rotatably secured in suitable bushings (not shown) provided respectively in end wall 3 and in a bracket 15 extending up from bottom wall 1.

A holder device 16 is formed with a substantially flat bottom 17, an upstanding back wall 18, and upstanding side walls 19 and 20; as shown, walls 19 and 20 may have inturned flanges 21 and 22 respectively formed at their ends. Base 17 of holder 16 seats on a carriage 23 terminating in a handle portion 24 extending through slot 25 in wall 5 of the housing. The carriage is supported on four small upstanding members 26, two on each side, and these members, when the carriage and holder means are operatively engaged by worm 14, as will be explained herebelow, are seated in grooves 27 and 28 formed in bottom wall 1 of the housing parallel to worm 14. Grooves 27 and 28 serve to guide the members 26 so that movement of the carriage 23 when engaged by worm 14 is in a straight line paralleling the two grooves.

Carriage 23 has a slot 29 provided therein substantially at right angles to the grooves 27 and 28, and the flat base 17 of holder 16 has an indentation 30 which extends into slot 29. If so desired, a spring 31 may be secured to holder bottom 17 by a rivet 32. Spring 31 bears on the underside of carriage 23 so as to prevent play between carriage 23 and holder bottom 17 without interfering with the sliding relationship thereof which is to be explained.

When carriage 23 is in the position shown in Figs. 2 and 3, members 26 are seated in grooves 27 and 28. In this position worm 14 is engaged by inwardly projecting parts 33 formed on a plate 34 secured to a downwardly projecting flange 35 on holder 16 by a pin and slot arrangement 36. A spring 37 biases plate member 34 so that when the carriage is in the position shown in Figs. 2 and 3 the spring will exert pressure on plate 34 to pull it upwardly to the position shown, but will yield sufficiently to avoid harm to the mechanism if the projections 33 should encounter the large diameter part of the worm instead of the small diameter part thereof. In such a case, the spring 37 remains extended until the worm 14 turns enough for projections 33 to engage the small diameter part of the worm, at which time spring 37 pulls plate 34 into the position shown so that an operative engagement of the projections 33 with worm 14 is provided. By means of this connection, as worm 14 is turned it causes the projections 33 to travel in a generally axial direction thereof and this in turn moves the carriage 23 with the projections.

To disconnect projections 33 from worm 14, handle 24 of carriage 23 is moved to the right as viewed in Fig. 4 to slide the carriage relative to holder 17 until the end of slot 29 of the carriage engages indentation 30 of the holder. This sliding forces the members 26 out of the grooves 27 and 28 and down twin inclined surfaces 38 so that the general effect is to lower carriage 23 parallel to surfaces 38 and lower holder 17 vertically as viewed in Figs. 3 and 4. This disconnects the projections 33 from the worm since the worm is now in the relatively large opening 39 of plate 34; thus, with the parts so positioned to make the worm inoperative to position or move the holder and carriage, an operator can slide carriage 23 to any desired position the length of the housing simply by exerting force on handle 24 in a direction generally parallel to the worm.

A group of switch housings 40, 41, 42 and 43 are secured to a member 44 which in turn has flanges 45 and 46 secured to walls 4 and 5 respectively of the control housing so that the switch housings 40 to 43 are rigidly secured with respect thereto. Referring now particularly to Fig. 1 it will be seen that switch housing 40 contains a plurality of switch arms 47, 48 and 49 secured in the housing. At their free end, they extend out of the right side of housing 40 (as viewed in Fig. 1) to provide prongs which may be electrically connected to suitable leads leading to electrical controls for an apparatus operation. At the other end of the switch arms, they are provided with suitable contact members 50 which are moved together and separated by switch actuator 51 slidably secured in a block 52 which in turn is rigidly attached between two flanges 53 depending from member 44. The downward travel of actuator 51 is limited by the enlarged switch-engaging head portion 54; beneath block 52, the actuator has an extending portion 55 which is engaged by appropriate cam surfaces as described below.

As can be seen in Figs. 3 and 4, the other switch housings 41, 42, and 43 also have suitable switch arms arranged similarly to those of switch housing 40, and actuators similar to actuator 51, and also secured in block 52, cooperate with them in the same manner as the actuator 51 with contact arms 47, 48 and 49 of switch housing 40.

Movement of actuator 51 is controlled by a cam surface 56 formed on a flat member, or card, 57 which lies flat on the bottom 17 of the holder member 16. Member 57 is inserted to the correct position by sliding it in through slot 25 along the holder bottom 17, which is substantially aligned with slot 25, until it abuts the stop or back wall 18, in which position it is also held in place by flanges 21 and 22 of side walls 19 and 20 respectively. Flat member 57 is preferably provided with a handle portion 58 which projects through slot 25 when the member is fully in position in holder 17 so that it may readily be removed when desired. If so desired, handle 58 may be provided with suitable inscriptions, as shown, to indicate to the operator the type of cycle the card will provide, and the particular operation provided at any one time. Flat member 57 may be inserted when carriage 23 is in the position shown in Fig. 4, i.e., when carriage 23 has moved down in response to travel of members 26 down inclined surfaces 38. Once the member 57 has been completely inserted and the carriage 23 moved axially to the position of Fig. 2, handle 24 is pulled back to the position shown in Fig. 3 to raise carriage 23 and holder 17.

When member 57 is fully inserted on holder 16, cam surface 56 is parallel to slot 25 and is aligned with actuator 51, and the other cam surfaces shown in Figs. 2, 3 and 4 are respectively aligned with the other actuators which in turn control the opening and closing of appropriate switch contacts to complete or interrupt or vary different operations. It will, of course, be understood that the switches are selected as to number and function in accordance with the operations to be controlled; merely as an example, the contacts of switch 40 which are controlled by cam 56, may, for instance, control whether a spin or agitation operation is to be provided by the transmission of a washing machine; cam 59 may control the timer motor circuit, that is, once the end 60 of cam 59 has been reached the timer motor 7 will shut off to terminate completely all operations; cam 61 may control appropriate contacts in switch housing 41 to determine the temperature of water for washing and rinsing the clothes, etc. Clearly, the particular function of the individual cams in their association with the switches is a matter of choice. The important point is that for each switch to be operated to control an operation there is a cam with appropriate rises and dwells, the rises being provided by the ridges such as shown at 62 and 63 (Fig. 2), and the dwells being provided by the ridgeless surfaces 64 aligned with the ridges.

Flat member 57 which, for instance, may be molded from a suitable plastic material, is preferably provided with another set of cam surfaces on its underside 65 so that a single member 57 may be used to provide two entirely different sequences of operation merely by removing the member, turning it upside down and reinserting it on holder 16. Thus, with a total of three cards, up to six completely different operations each representing the optimum sequence for any particular type of fabric may be provided. The only operation required to effect a complete change in the sequence of operation is the removal of the previously used card or member 57 and the insertion of the appropriate one.

Thus, assuming that a particular sequence is desired, carriage 23 is lowered to the position shown in Fig. 4 and a member 57 is then inserted. The carriage is then moved axially to the position shown in Fig. 2 and is raised by causing members 26 to travel up inclines 38 into grooves 27 and 28. At this point, projections 33 on member 34 engage worm 14. Also, each of the cam surfaces provided on member 57 is in operative relationship to an actuator controlling appropriate switches which in turn control the functioning or non-functioning of particular apparatus sequence. Operation of the timer motor 7, where it is controlled by cam 59, is effected by positioning the carriage 23 as viewed in Fig. 2 so that cam 59 raises actuator 66 to close the appropriate contacts (not shown) to complete an electric circuit through timer motor 7. The timer motor then rotates worm 14 at a predetermined slow rate of speed, and through the engagement of projections 33 with the worm 14 the carriage 23 carrying holder 16 and card 57 is slowly moved to the right as viewed in Fig. 2. As it moves, each of the cams causes each of the actuators to be moved either to a position to operate the switches with which it is associated or to open them, each cam having appropriate rises and dwells to cause a particular apparatus operation to be performed in a particular sequence. The motion of carriage 23 to the right as actuated by worm 14 continues until actuator 66 drops off the end 60 of cam 59 to open the circuit of the timer motor and stop any further operation. Prior to this, all other circuits have normally been opened so that opening of the timer motor circuit signifies the end of a complete operation performed with all the desired sequences.

To start another operation it is merely necessary to move handle 24 in so that the carriage 23 goes down inclines 38, remove card 57, replace it with any other appropriate card, slide the carriage assembly back to the left to the starting point as viewed in Fig. 2, and then pull handle 24 out to raise the carriage to its operative position so that members 26 are in grooves 27 and 28.

In accordance with the patent statutes, I have described what at present is considered to be the preferred embodiment of my invention, but it will be obvious to those skilled in the art that various changes and modifications may be made therein without departing from the true spirit and scope of the invention, and I therefore aim to cover in the appended claims all such equivalent variations and modifications.

What I claim as new and desire to secure by Letters Patent of the United States is:

1. A control mechanism for providing a selected one of a plurality of sequences of apparatus operations, said mechanism comprising movable holder means, a member removably secured on said holder means, a cam surface formed on said removably secured member, a switch for controlling an apparatus operation, a timer motor, and motion transmitting means, said holder means being movable to a first position and a second position relative to said motion transmitting means, said motion transmitting means connecting said holder means in said first position to said timer motor to cause said holder means to be moved relative to said switch, said holder means in said second position being disconnected from said motion transmitting means, said cam surface being formed and positioned to engage said switch in controlling relation thereto when said holder means is in said first position, said cam surface being removed from controlling relation to said switch and said removably secured member being freely removable from said holder means in the second position of said holder means.

2. The control mechanism defined in claim 1 wherein said removably secured member is substantialy flat with different cam surfaces formed on its opposing faces, each of said cam surfaces being formed and positioned to engage said switch in controlling relation thereto when it is arranged on the exposed face of said removably secured member whereby said one removably secured member can provide two different sequences for said switch depending on which face of said removably secured member is exposed.

3. A control mechanism for providing a selected one of a plurality of sequences of apparatus operations, said mechanism comprising movable holder means, a substantially flat member removably secured on said holder means, a plurality of substantially parallel cam surfaces formed on the face of said flat member, a plurality of switches for controlling apparatus operations, a timer motor, and motion transmitting means, said holder being movable to first and second positions relative to said motion transmitting means, said motion transmitting means connecting said timer motor to said holder means in said first position to cause said holder means to be moved relative to said switches, said holder means in said second position being disconnected from said motion transmitting means, said cam surfaces being formed and positioned to engage said switches respectively in controlling relation thereto when said holder means is in said first position, said cam surfaces being removed from controlling relation to said switches and said flat member being freely removable from said holder means in the second position of said holder means.

References Cited in the file of this patent

UNITED STATES PATENTS

| | | |
|---|---|---|
| 585,915 | Johnston | July 6, 1897 |
| 1,686,852 | Gorman | Oct. 9, 1928 |
| 1,757,124 | Lauterbur et al. | May 6, 1930 |
| 1,905,228 | James | Apr. 25, 1933 |
| 1,964,846 | Earnshaw | July 3, 1934 |
| 2,055,031 | Hutchings | Sept. 26, 1936 |
| 2,501,274 | Hamilton | Mar. 21, 1950 |
| 2,556,095 | Loewenstein | June 5, 1951 |
| 2,641,661 | Puerner et al. | June 9, 1953 |

FOREIGN PATENTS

| | | |
|---|---|---|
| 571,328 | Germany | Feb. 27, 1933 |